(12) United States Patent
Katzav et al.

(10) Patent No.: US 11,228,475 B2
(45) Date of Patent: Jan. 18, 2022

(54) 2G/3G SIGNALS OVER 4G/5G VIRTUAL RAN ARCHITECTURE

(71) Applicant: Parallel Wireless, Inc., Nashua, NH (US)

(72) Inventors: Ofir Ben Ari Katzav, Zur Itshak (IL); Rajesh Kumar Mishra, Westford, MA (US); Baruch Navon, Alumot (IL)

(73) Assignee: Parallel Wireless, Inc., Nashua, NH (US)

( * ) Notice: Subject to any disclaimer, the term of this patent is extended or adjusted under 35 U.S.C. 154(b) by 51 days.

(21) Appl. No.: 16/733,947

(22) Filed: Jan. 3, 2020

(65) Prior Publication Data

US 2020/0220759 A1 Jul. 9, 2020

Related U.S. Application Data

(60) Provisional application No. 62/788,081, filed on Jan. 3, 2019.

(51) Int. Cl.
*H04J 11/00* (2006.01)
*H04L 27/26* (2006.01)
*H04B 1/00* (2006.01)
*H04W 72/04* (2009.01)

(52) U.S. Cl.
CPC ....... *H04L 27/2636* (2013.01); *H04B 1/0007* (2013.01); *H04W 72/0446* (2013.01)

(58) Field of Classification Search
CPC ............. H04L 27/2636; H04B 1/0007; H04W 72/0446
See application file for complete search history.

(56) References Cited

U.S. PATENT DOCUMENTS

| | | |
|---|---|---|
| 8,116,278 B2 | 2/2012 | Green |
| 10,367,677 B2 | 7/2019 | Parkvall et al. |
| 10,630,410 B2 | 4/2020 | Parkvall et al. |
| 2011/0275359 A1 | 11/2011 | Sebire et al. |
| 2012/0140743 A1 | 6/2012 | Pelletier et al. |
| 2013/0044709 A1 | 2/2013 | Adjakple et al. |
| 2013/0088983 A1 | 4/2013 | Pragada et al. |
| 2016/0183136 A1 | 6/2016 | Comeau |
| 2018/0324752 A1* | 11/2018 | Kim ...................... H04W 68/005 |
| 2018/0359742 A1* | 12/2018 | Patel ................... H04W 72/042 |
| 2019/0223154 A1* | 7/2019 | Jia .......................... H04W 76/10 |
| 2019/0364611 A1 | 11/2019 | Centonza et al. |
| 2020/0120735 A1* | 4/2020 | Wang .................... H04L 5/0098 |

* cited by examiner

*Primary Examiner* — Phuongchau Ba Nguyen
(74) *Attorney, Agent, or Firm* — Michael Y. Saji; David W. Rouille (57) ABSTRACT

Systems, methods and computer software are disclosed for providing 2G/3G communication over 4G/5G distributed unit (DU) in a virtual Radio Access Network (RAN) architecture.

20 Claims, 10 Drawing Sheets

2G/3G SIGNALS OVER 4G/5G VIRTUAL RAN ARCHITECTURE

Cross-Reference to Related Applications

This application claims priority under 35 U.S.C. § 119(e) to U.S. Provisional Pat. App. No. 62/788,081, filed Jan. 3, 2019, titled "2G/3G signals Over 4G/5G Virtual RAN Architecture" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, having attorney docket numbers PWS-71700US01, US02, US03, 71710US01, 71721US01, 71729US01, 71730US01, 71731US01, 71756US01, 71775US01, 71865US01, and 71866US01, respectively. This document also hereby incorporates by reference U.S. Pat. Nos. 9107092, 8867418, and 9232547 in their entirety. This document also hereby incorporates by reference U.S. patent application Ser. No. 14/822,839, U.S. patent application Ser. No. 15/828427, U.S. Pat. App. Pub. Nos. US20170273134A1, US20170127409A1 in their entirety. Features and characteristics of and pertaining to the systems and methods described in the present disclosure, including details of the multi-RAT nodes and the gateway described herein, are provided in the documents incorporated by reference.

BACKGROUND 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device. 3GPP defines a Multi-User Superposition Transmission (MUST) feature that allows multi user transmission. In this feature, the Modulation block was modified to allow overlapping modulations (high QAM and low QAM) within the same symbol. The latter enables I/Q outputs different than predefined constellation points.

US8116278 suggests taking time domain represented signals, convert them to frequency domain (e.g. GSM signal from time domain to frequency domain), in the frequency domain a sub-carrier allocation is made and then iFFT is used to move back to time domain. US20110275359A1, US20120140743A1 are talking about serving UE(s) with more than one cellular technology based on carrier aggregation feature defined in LTE but do not suggest running the signal over the same physical radio resource. This is another use of carrier aggregation feature to multiplex various technologies with LTE signal. US20130088983A1 suggest combining of LTE and Wi-Fi over the same HW but the combining is at the MAC/protocol level and not the PHY level. None of the patents or publications described above disclose or suggest the present invention.

SUMMARY

Systems and methods for providing communication signals in a Radio Access Network (RAN) architecture are disclosed.

In one embodiment, a method is disclosed for providing signals for time domain radio access communication over a distributed unit (DU) in a virtual Radio Access Network (RAN) architecture supporting frequency domain signal generation, comprising: dividing a PHY layer between the DU and a Centralized Unit (CU) between an upper PHY and a lower PHY for a first radio access technology in a radio frequency (RF) transmission chain, The first radio access technology may be a frequency domain radio access technology, wherein a PHY layer may be divided between the DU and the CU, The DU may include the lower PHY, and The CU may include the upper PHY; generating time domain radio access communication signals for a second radio access technology; injecting the time domain radio access communication signals into the RF transmission chain; and receiving and transmitting the time domain radio access communication signals in accordance with the selected split option using the DU.

The method may further comprise selecting a split option that splits the CU and DU at the analog to digital conversion (ADC)/digital to analog conversion (DAC) level such that ADC/DAC operation may be performed at the DU and all other PHY operations may be done at the CU. The method may further comprise injecting 2G/3G signals into the DAC, and The method may further comprise extracting 2G/3G signals from the ADC with a 4G/5G DU. The method may further comprise adding configuration options for the DU to modify an ADC/DAC sample rate and adding filters to comply with 2G/3G requirements.

The split option selected may include a time domain part, and The method may further comprise transferring frequency domain samples between the CU and the DU. The method may further comprise: injecting a 2G/3G signal generated in the time domain into a 4G/5G DU while bypassing an inverse Fast Fourier Transform (iFFT) block; and extracting the 2G/3G signal from the 4G/5G DU while bypassing a Fast Fourier Transform (FFT) block. The method may further comprise: generating a 2G/3G signal at the time domain and performing a Fast Fourier Transform (FFT) operation at the CU, and injecting it into a 4G/5G DU as a frequency domain signal; and extracting the 2G/3G signal from the 4G/5G DU after the FFT operation, and processing the signal through the CU. The method may further comprise: generating a 2G/3G signal at the frequency domain and injecting it into a 4G/5G DU; and extracting the 2G/3G signal from the 4G/5G DU and processing the signal in the frequency domain. The method may further comprise performing resource element mapping and demapping. The split option may include the DL stream handled in the DU from a modulation block toward an RF part, and wherein at least one of modulation, layer mapping, precoding, resource element mapping and inverse Fast Fourier Transform (iFFT) may be able to be bypassed.

The method may further comprise using a Multi-User Superposition Transmission (MUST) feature to manipulate a modulator In-phase/Quadrature (I/Q) output such that I/Q output samples reflect a desired 2G/3G signal. The split option may be done between the Media Access Control (MAC) layer and the Physical (PHY) layer. The method may further comprise injecting a 2G/3G signal generated at the time domain into a 4G/5G DU while bypassing Encoder, Rate Matching, Scrambling, Modulation, Layer Mapping, Precoding, RE mapping and iFFT blocks. The method may further comprise passing a 2G/3G signal generated in a frequency domain through De-Scrambling into a 4G/5G DU split option 6 while bypassing an Encoder and/or Rate Matching.

In another embodiment, a non-transitory computer-readable medium is disclosed containing instructions for providing 2G/3G communication over 4G/5G distributed unit (DU) in a virtual Radio Access Network (RAN) architecture, which, when executed, cause a system to perform steps comprising: dividing a PHY layer between the DU and a Centralized Unit (CU) between an upper PHY and a lower PHY for a first radio access technology in a radio frequency (RF) transmission chain, The first radio access technology may be a frequency domain radio access technology, wherein a PHY layer may be divided between the DU and the CU, The DU may include the lower PHY, and The CU may include the upper PHY; generating time domain radio access communication signals for a second radio access technology; injecting the time domain radio access communication signals into the RF transmission chain; and receiving and transmitting the time domain radio access communication signals in accordance with the selected split option using the DU.

The non-transitory computer-readable medium of claim 15, the steps The method may further comprise selecting the split option to split the CU and DU at an Analog to Digital Conversion (ADC)/Digital to Analog Conversion (DAC) level such that ADC/DAC operation may be performed at the DU and all other PHY operations may be done at the CU. The non-transitory computer-readable medium of claim 15, The split option selected may include a time domain part and wherein frequency domain samples may be transferred between the CU and the DU. The non-transitory computer-readable medium of claim 15, the steps The method may further comprise including a DL stream handled in the DU from a modulation block toward an RF part, and bypassing at least one of modulation, layer mapping, precoding, resource element mapping and inverse Fast Fourier Transform (iFFT). The non-transitory computer-readable medium of claim 15, wherein a split option may be selected to split the Media Access Control (MAC) layer and the Physical (PHY) layer.

In another embodiment, a system is disclosed for providing 2G/3G communication over 4G/5G distributed unit (DU) in a virtual Radio Access Network (RAN) architecture, comprising: at least one processor at a RAN node in communication with a 2G/3G core network and a 4G/5G core network; and at least one memory in communication with the processor, The processor enables selecting at least one split option between an upper PHY and lower PHY; The PHY layer may be divided between the DU and a Centralized Unit (CU); The DU may include a lower PHY and the CU may include an upper PHY; and The processor enables receiving and transmitting 2G/3G signals in the virtual RAN in accordance with the selected split option using the 4G/5G DUs.

In another embodiment a method is disclosed that includes selecting at least one split option between an upper PHY and lower PHY and between a PHY layer and a MAC layer; wherein the PHY layer is divided between the DU and a Centralized Unit (CU), wherein the DU includes a lower PHY and the CU includes an upper PHY; and receiving and transmitting 2G/3G signals in the virtual RAN in accordance with the selected split option using the 4G/5G DUs.

In some embodiments, a method includes: selecting at least one split option between an upper PHY and lower PHY and between a PHY layer and a MAC layer; wherein the PHY layer is divided between the DU and a Centralized Unit (CU), wherein the DU includes a lower PHY and the CU includes an upper PHY; and receiving and transmitting 2G/3G signals in the virtual RAN in accordance with the selected split option using the 4G/5G DUs.

In some embodiments, the split option comprises option 8, wherein the split option selected splits the CU and DU at the ADC/DAC level where ADC/DAC operation is performed at the DU and all other PHY operations are done at the CU.

In some embodiments, the split option comprises option 7 which includes option 7.1, 7.2, and 7.3. In option 7.1 and wherein the split option selected includes a time domain part and wherein frequency domain samples are transferred between the CU and the DU. Option 7.1 includes comprising injecting the 2G/3G signal generated in the time domain into the 4G/5G DU while bypassing an inverse Fast Fourier Transform (iFFT) block; and extracting the 2G/3G signal from the 4G/5G DU while bypassing a Fast Fourier Transform (FFT) block. Option 7.2 includes generating the 2G/3G signal at the frequency domain and injecting it into the 4G/5G DU; and extracting the 2G/3G signal from the 4G/5G DU and processing the signal in the frequency domain. Option 7.3 includes the DL stream handled in the DU from a modulation block toward an RF part and wherein at least one of modulation, layer mapping, precoding, resource element mapping and inverse Fast Fourier Transform (iFFT) are able to be bypassed.

In some embodiments the split option comprises option 6, wherein the split option is done between the Media Access Control (MAC) layer and the Physical (PHY) layer.

DETAILED DESCRIPTION

Although prior publications talk about transferring a time domain generated signal (e.g. 2G) to frequency domain and about aggregating LTE and non-OFDM signals in such method it's not presenting the same concept as the present application. Meaning, there is no direct suggestion to present 2G/3G signals over LTE/5G DU/RRH. Moreover, it doesn't handle the split options discussed in our work. In our work we explain how transmission/reception of 2G/3G is possible with LTE/5G DU/RRH in V-RAN architecture and not how to multiplex them independently. Additionally, the inventors have contemplated switching a 2G/3G signal to frequency domain and then use 4G transmitter/receiver to transmit the signal correctly—this method is one of our suggestion to enable 2G/3G over LTE radio—this method was not specifically mentioned in the patent, e.g., combining of LTE signal (mentioned as OFDM signal), with non-OFDM signal (like 2G/3G).

Figure 1:
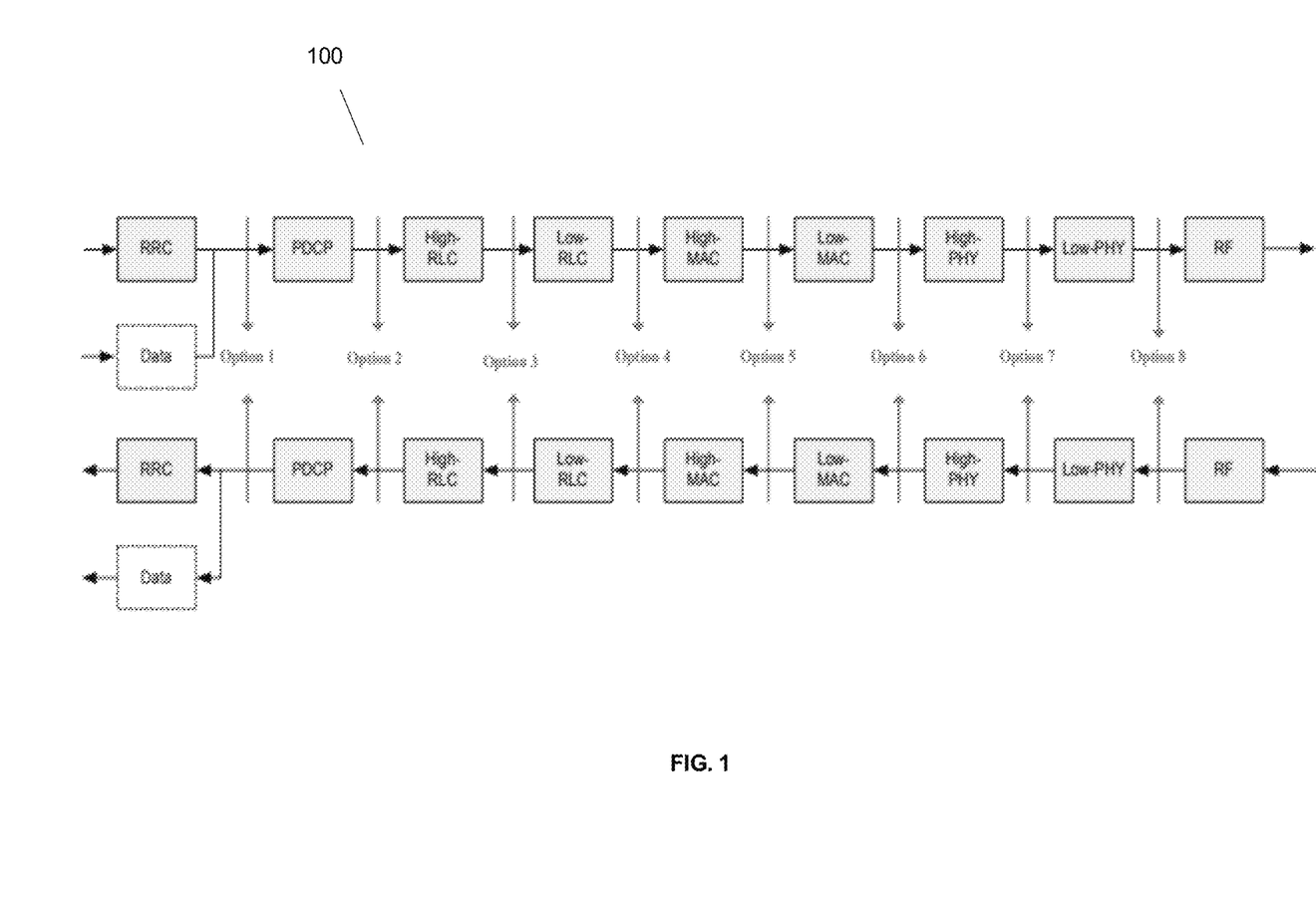
FIG. 1 is a diagram showing different split options, in accordance with some embodiments.

Referring to FIG. 1, a diagram of split options alternatives 100 is shown. The diagram shows split options 1 to 8. Split option 8 defines a split at the Analog-to-Digital Converter (ADC) output and the Digital-to Analog Converter (DAC) input. This option is the most demanding one in terms of data rate and latency. Split option 7 defines a split within the PHY layer. Split option 6 defines a split between the PHY and the MAC which doesn't require high data rates compared to options 7 and 8. Other options presented in FIG. 1 are in some cases dependent on the specific radio access technology and not described here.

Figure 2:
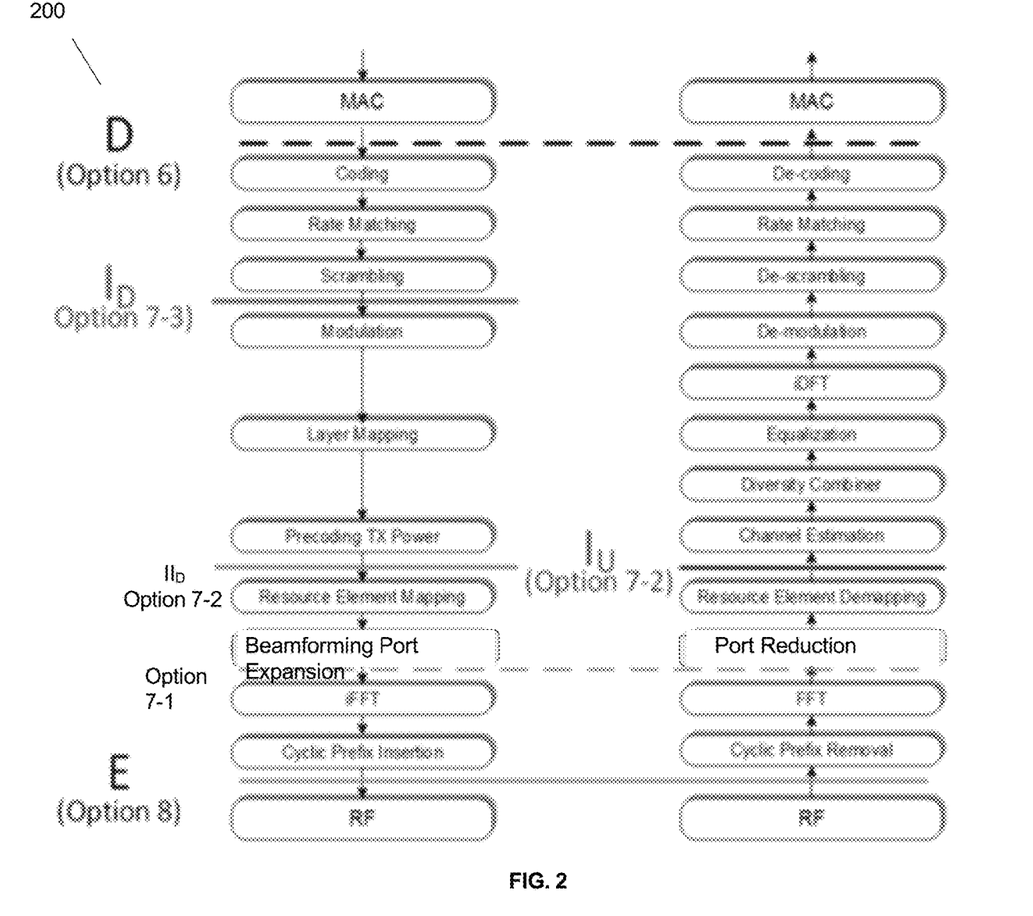
FIG. 2 is a diagram showing different split options and the processing blocks they include, in accordance with some embodiments.

Referring now to FIG. 2, diagram 200 shows split options 6, 7.1, 7.2, 7.3 and 8. Split option 7 can be divided into sub-options 7.1, 7.2, and 7.3. Split option 7.1 defines a split between the time-domain and frequency domains of the PHY. This option serves well the concept of easily changing the frequency domain implementation at the CU. Split option 7.2 includes the RE mapping and the beamforming handling on top of split option 7.1. Split option 7.3 defines a split at the modulation block. It may or may not include the scrambling block.

In Option 7.1: The DU is doing the iFFT/FFT and CP insertion/removal. Alternatives to implement 2G/3G over LTE DU with Option 7.1 include:

iFFT/FFT (+CP insertion/removal) bypass option if exists. Generate the 2G/3G signal in the frequency domain instead of time domain—implementation challenge but possible. Generate 2G/3G signal in time domain (as today) and run the inverse operations on the CU. e.g. in the DL, do FFT at the CU, the DU will perform iFFT and will cancel the FFT operation. CP insertion can be handled by allocating NULL/ZERO signal at the carriers that will be copied for CP insertion. Requires alignment between FFT sample rate to 2G/3G symbol time—relatively easy implementation. CP can be configured for zero time duration, hence, won't be included in the output signal.

Figure 3A:
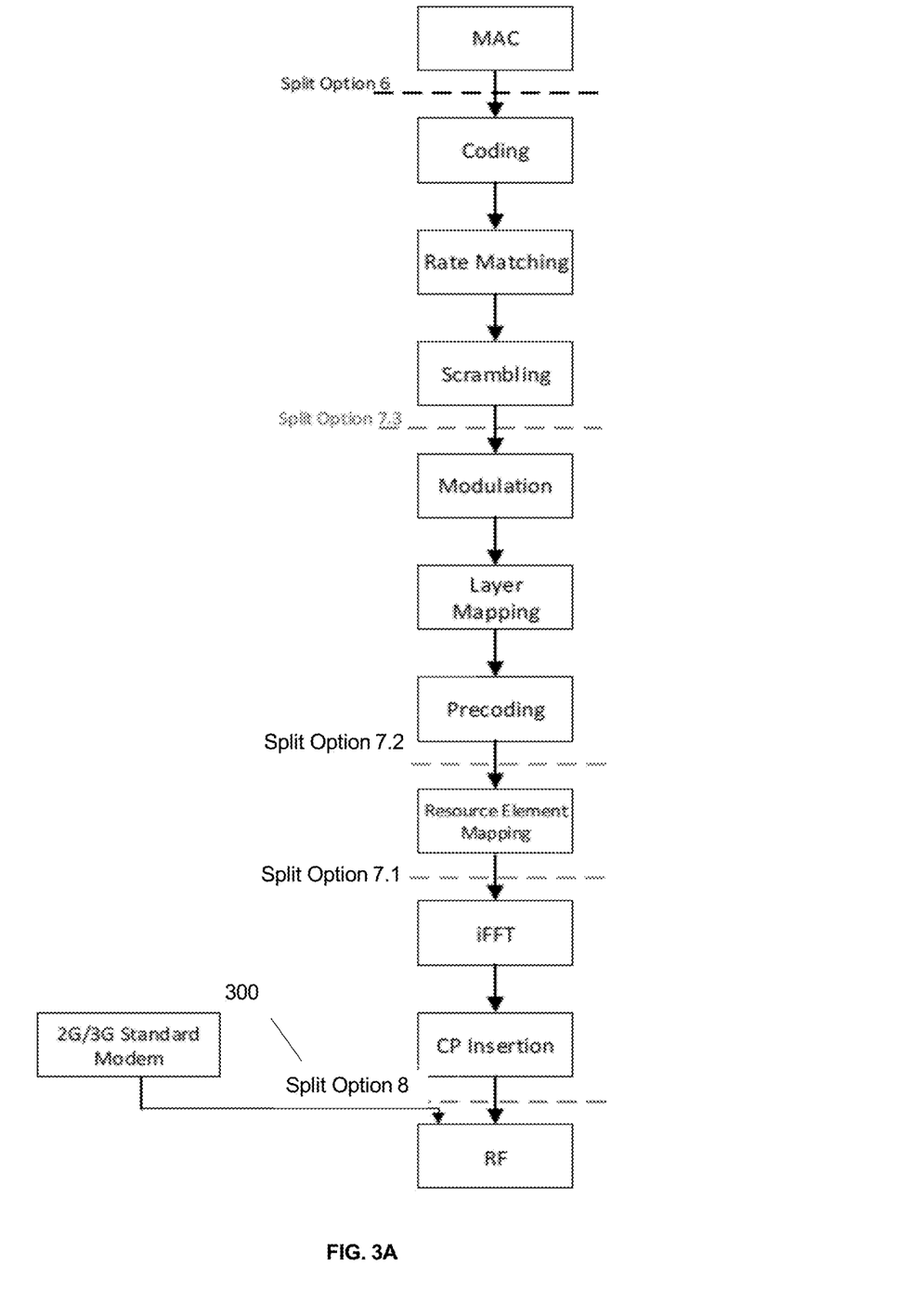
FIGS. 3A and 3B show split option 8, in accordance with some embodiments.
Figure 3B:
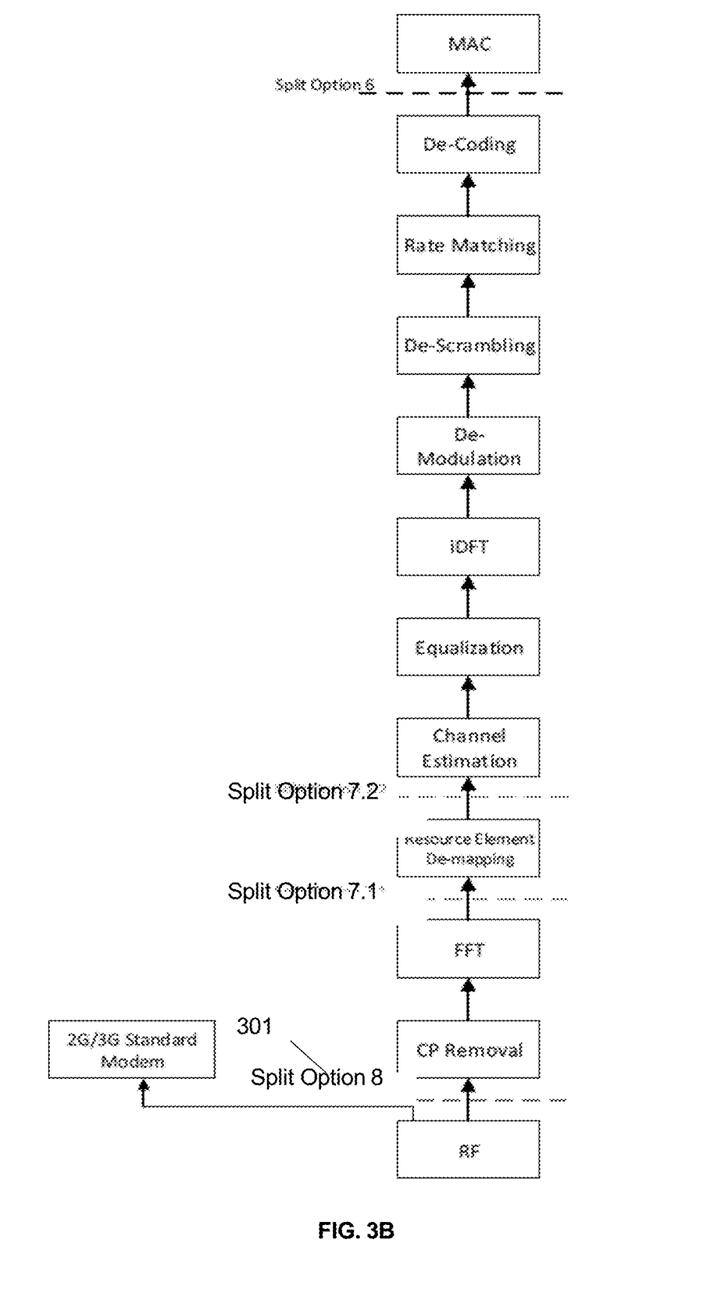

Split option 8 splits the CU and DU at the ADC/DAC level where ADC/DAC operation is performance at the DU and all other PHY operations are done at the CU. Split option 8 defines that the DU starts at the DAC in the DL and ends at the ADC in the UL. This option is generic by design and hence, injection of 2G/3G signals into the DAC or extraction of them from the ADC is possible. The only thing we shall take care of is the ADC/DAC/filters configuration to comply with 2G/3G demands.

Alternatives to implement 2G/3G over LTE DU with Option 8: 1. For DL: a. Simply inject the desired signal to the DAC. i. BW/sample rate configuration might be needed. ii. Signal filtering shall be done at the CU since radio BW might be higher and analog filters might be not enough (relevant to 2G mainly, 3G signal BW can be handled by 3 MHz/5 MHz LTE signal). 2. For UL: a. Simply extract the signal from the ADC. i. BW/sample rate configuration might be needed. ii. Proper filtering is done at the CU.

Embodiments may include: the option to inject 2G/3G signals directly to the DAC and/or extract them directly from the ADC with 4G/5G DU; and adding configuration options for the DU that will modify the ADC/DAC sample rate as well as filters to comply with 2G/3G needs.

FIGS. 3A and 3B show the proposed solutions 300 and 301 for split option 8.

Figure 4A:
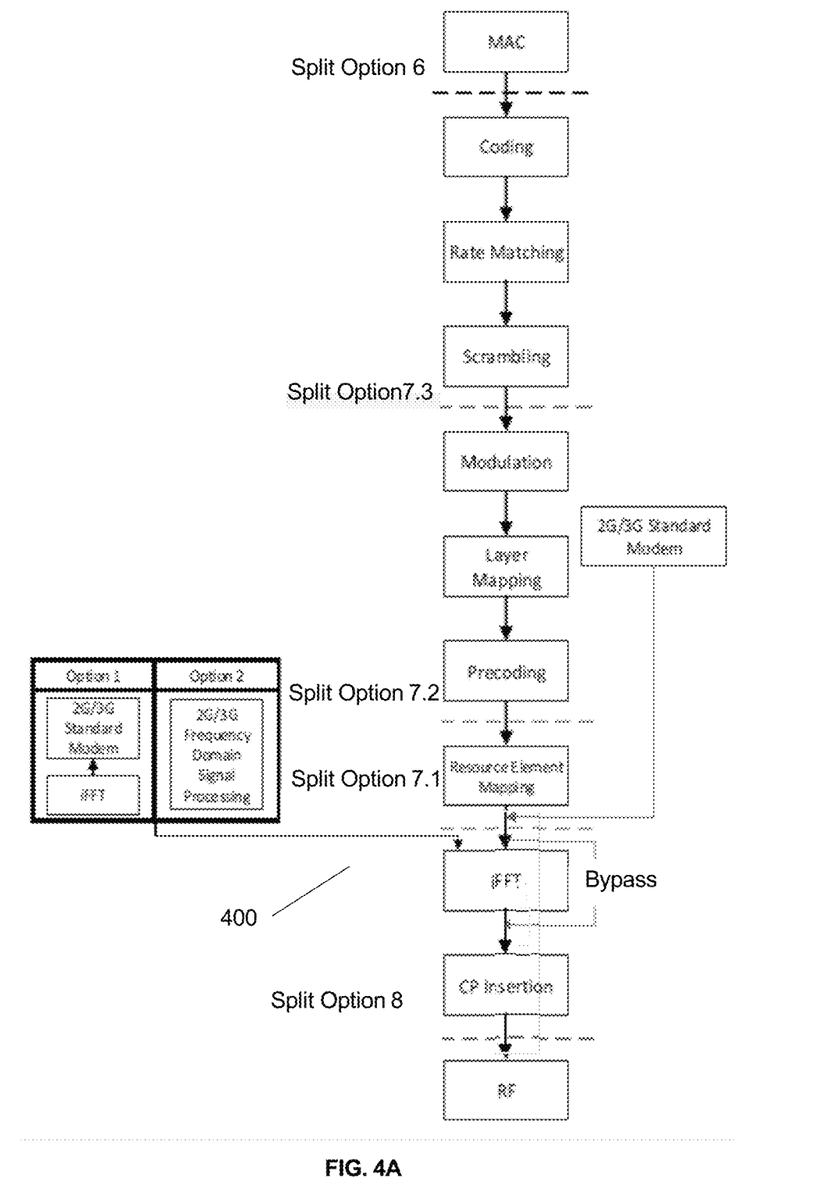
FIGS. 4A and 4B show split option 7.1, in accordance with some embodiments.
Figure 4B:
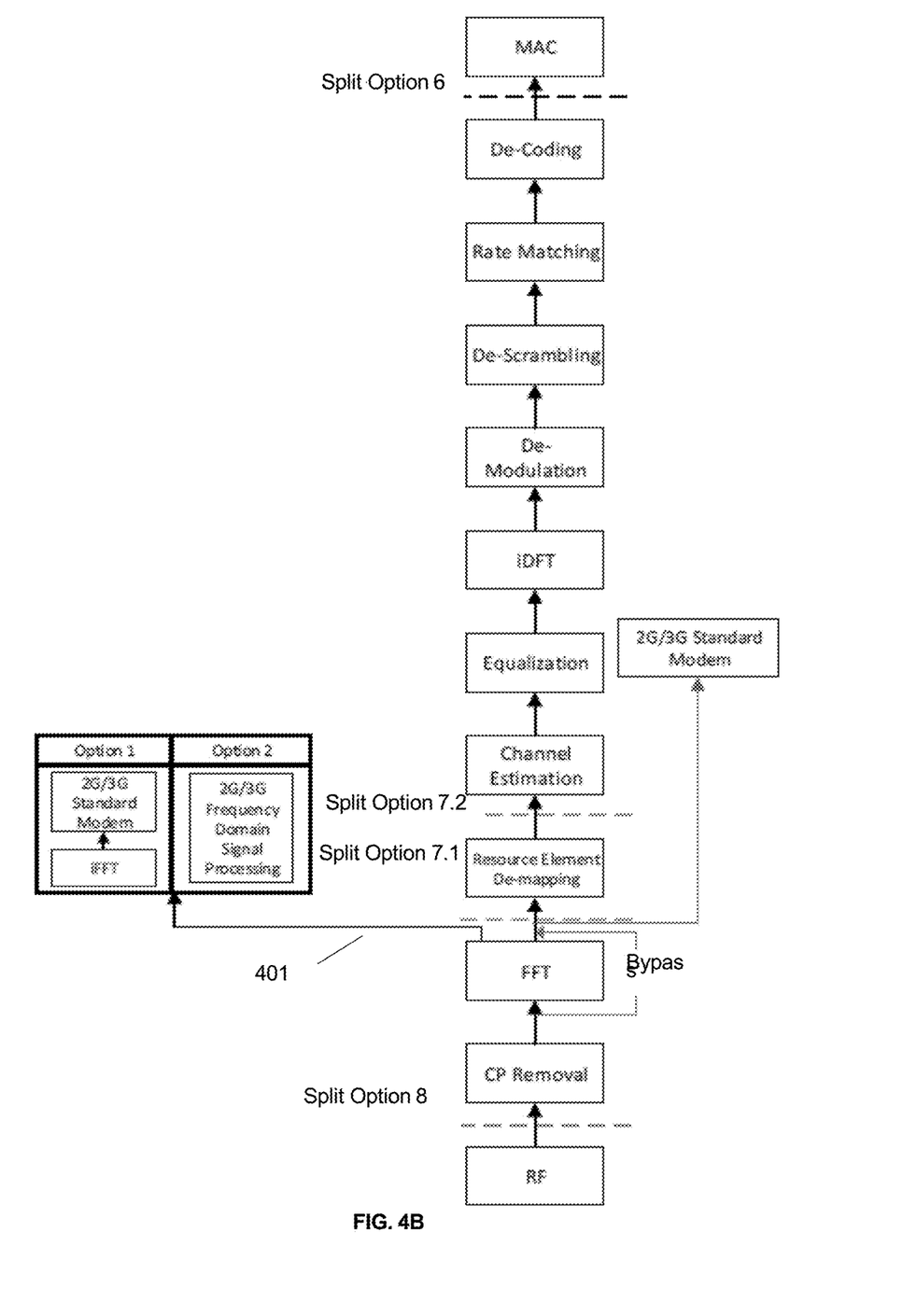

FIGS. 4A and 4B show split option 7.1. In this split option, the DU includes the time domain part and the frequency domain samples are transferred between the DU and the CU. This option loses the flexibility for time-domain implementation modifications but provides good measures to modify the frequency domain implementation at the CU which is commonly the area with more changes over time.

Embodiments may include: in the DL, injection of 2G/3G signal generated at the time domain into the 4G/5G DU while bypassing the iFFT block; and in the UL, extraction of 2G/3G signal from the 4G/5G DU while bypassing the FFT block. Full processing of the signal continues in the traditional ways at the CU. Embodiments may further include: in DL, generation of 2G/3G signal at the time domain and performing on it FFT operation at the CU. Then injecting it into the 4G/5G DU as a frequency domain signal. Embodiments may further include: in UL, extraction of 2G/3G signal from the 4G/5G DU after the FFT operation. Then passing it through iFFT (going back to time domain) at the CU and continue processing in the traditional ways at the CU. Embodiments may further include: in DL, generate the 2G/3G signal at the frequency domain (instead of time domain) and inject it into the 4G/5G DU. Embodiments may further include: in UL, extract the 2G/3G signal from the 4G/5G DU and process it in the frequency domain (instead of time domain).

For example, e.g. in the DL, do FFT at the CU, the DU will perform iFFT and will cancel the FFT operation. CP insertion can be handled by allocating NULL/ZERO signal at the carriers that will be copied for CP insertion Requires alignment between FFT sample rate to 2G/3G symbol time—relatively easy implementation. CP can be configured for zero time duration, hence, won't be included in the output signal.

Figure 5A:
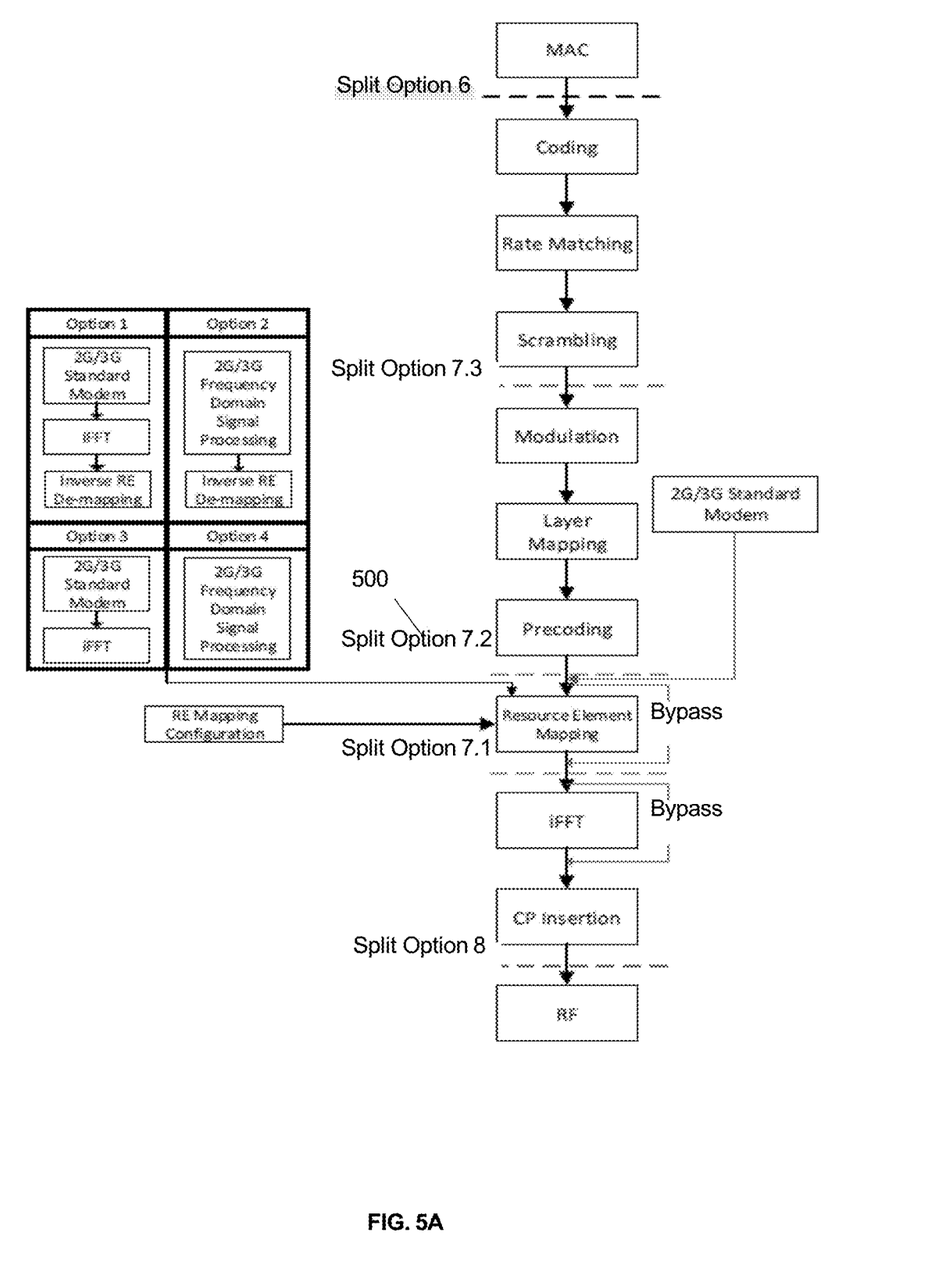
FIGS. 5A and 5B show split option 7.2, in accordance with some embodiments.
Figure 5B:
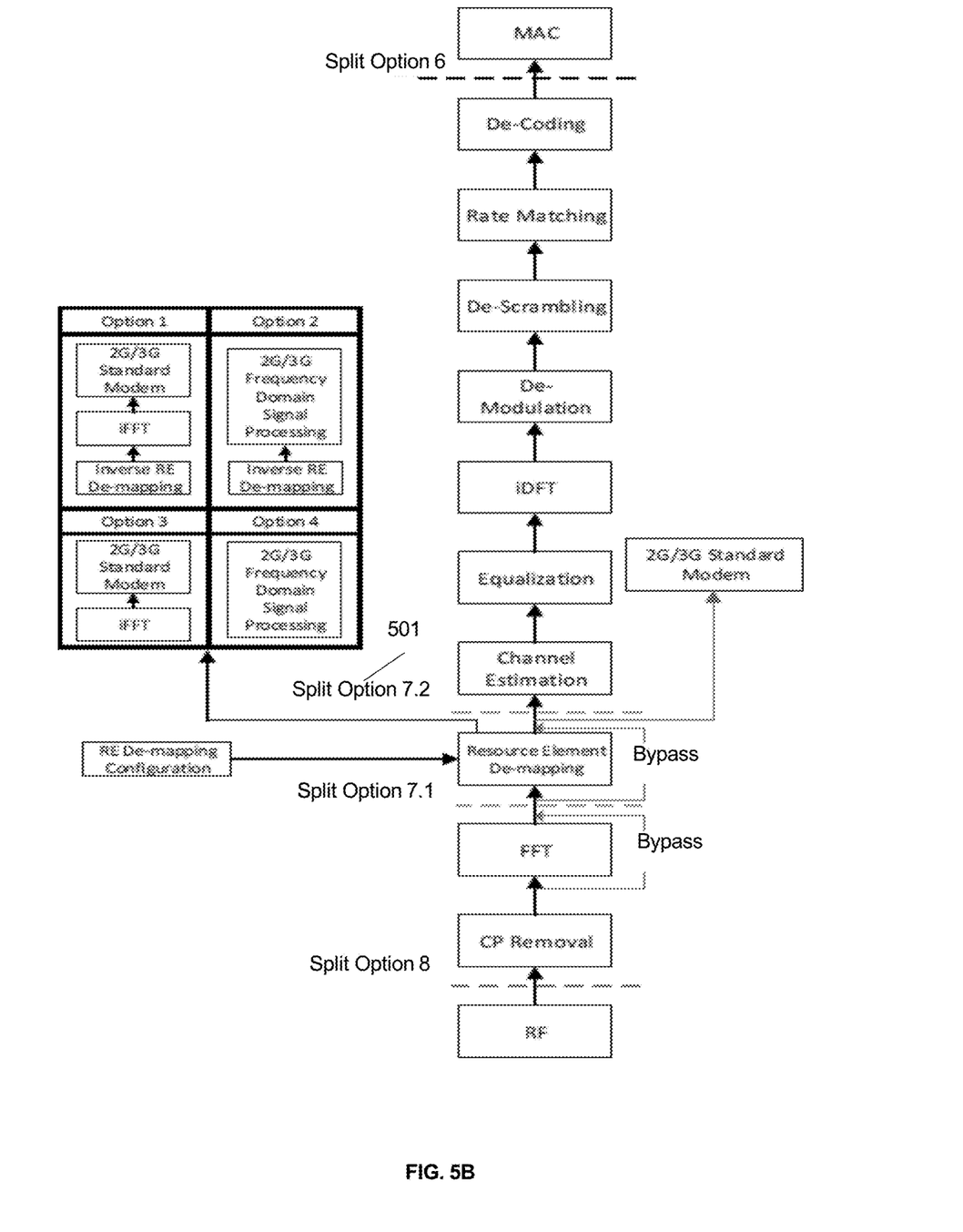

FIGS. 5A and 5B show the split option 7.2. In this Split option, the DU includes the resource element mapping/de-mapping on top of the blocks specified in split option 7.1. Embodiments may further include: in the DL, injection of 2G/3G signal generated at the time domain into the 4G/5G DU while bypassing the RE mapping & iFFT blocks; and in the UL, extraction of 2G/3G signal from the 4G/5G DU while bypassing the FFT & RE de-mapping blocks. Full processing of the signal continues in the traditional ways at the CU. Embodiments may further include: in DL, generation of 2G/3G signal at the time domain and performing on it FFT operation at the CU; then injecting it into the 4G/5G DU as a frequency domain signal. In this case, RE-mapping block will be configured such that at its output 2G/3G frequency domain will be obtained.

Split Option 7.2:

The DU includes the iFFT/FFT, CP insertion/removal and mapping/de-mapping Alternatives to implement 2G/3G over LTE DU with Option 7.2: iFFT/FFT, CP insertion/removal and mapping/de-mapping bypass option if exists; perform the inverse mapping/de-mapping in the CU and solve based on option 7.1 alternatives; and/or generate 2G/3G signal in such manner that the mapping/de-mapping functions will be combined in the mathematical evaluation of it.

Figure 6:
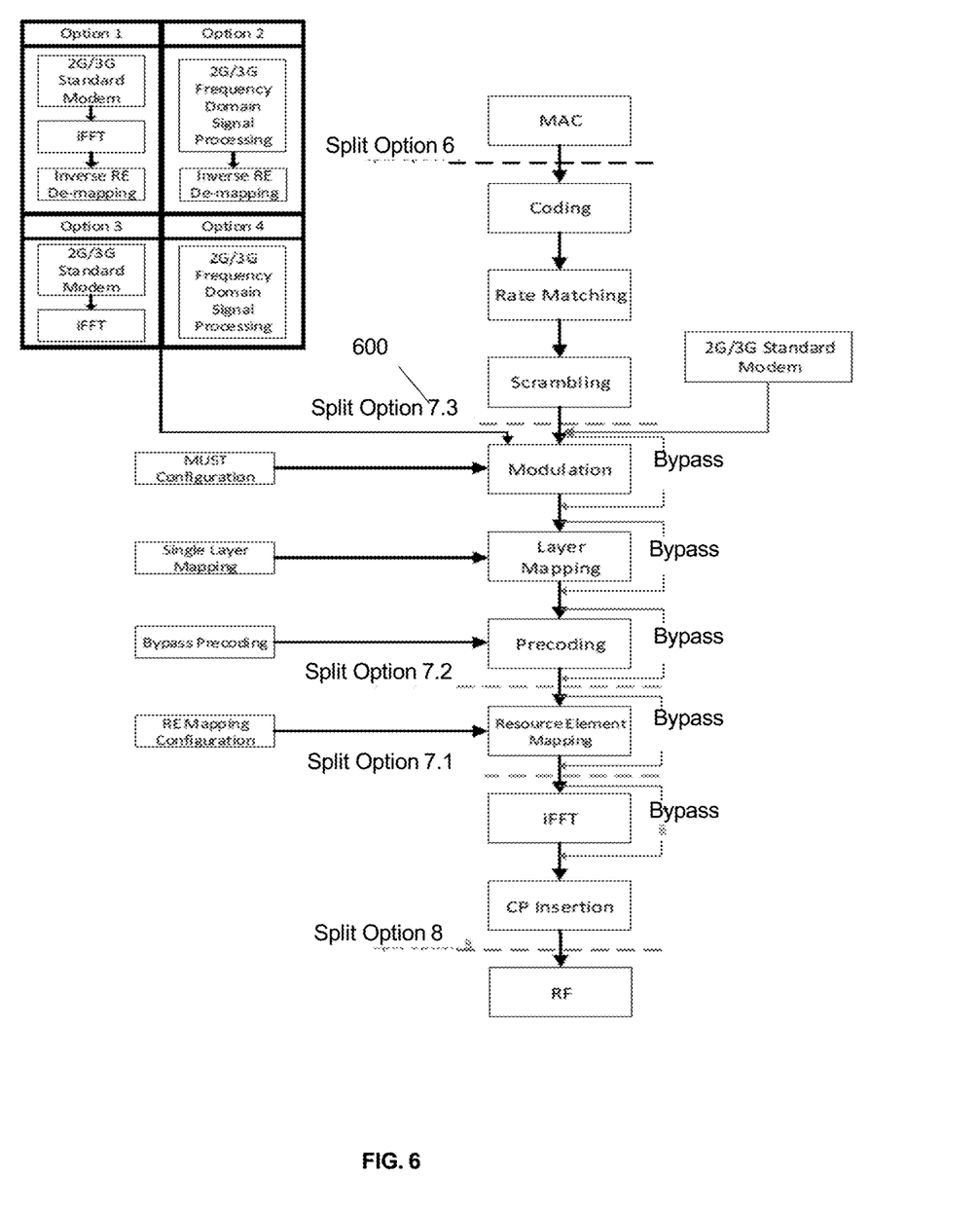
FIG. 6 shows split option 7.3, in accordance with some embodiments.

Split Option 7.3:

In addition to option 7.2, in option 7.3 the DU includes also the scrambling/de-scrambling, layer mapping, modulation and potentially beamforming. Alternatives to implement 2G/3G over LTE DU with Option 7.3: 1. iFFT/FFT, CP insertion/removal, mapping/de-mapping, scrambling, etc. bypass option if exists. 2. Perform inverse scrambling/de-scrambling, do single layer mapping and "inversemodulation/de-modulation" function in the CU and solve based on option 7.2 3. Generate 2G/3G signal in such manner that LTE operations will result standard signal at the output—requires mathematical evaluation of this new approach. In our work, a method that uses the principles of MUST is used to (e.g., generically) generate I/Q outputs in such manner that the Modulator output will reflect an appropriate 2G/3G signal.

Embodiments may further include: in UL, extraction of 2G/3G signal from the 4G/5G DU after the FFT operation and with RE de-mapping block configuration that path through the data in the de-mapping process; then passing it through iFFT (going back to time domain) at the CU and continue processing in the traditional ways at the CU.

Embodiments may further include: in UL, extraction of 2G/3G signal from the 4G/5G DU after the FFT operation and with RE de-mapping block configuration known and inversible at the CU. At the CU, inverse action to the de-mapping and/or reordering shall be done. Afterward, iFFT is performance (going back to time domain) at the CU and continue processing in the traditional ways at the CU.

Embodiments may further include: in DL, generate the 2G/3G signal at the frequency domain (instead of time domain) and inject it into the 4G/5G DU. RE mapping block is configured at bypass mode or with configuration that provide the wanted 2G/3G signal at the output.

Embodiments may further include: same as preceding paragraph but when CU reorder the data bits such that at the DU RE mapping block the output will be received as the desired 2G/3G signal; and in UL, extract the 2G/3G signal from the 4G/5G DU and process it in the frequency domain (instead of time domain). RE de-mapping block will be configured to either bypass, or path through, or is such manner that combined with CU reordering operation will result with the desired 2G/3G signal.

FIG. 6 shows split option 7.3. In this Split option the DL stream handled in the DU from the Modulation block toward the RF part. The precoding and layer mapping blocks are by-design bypass-able so our focus here will be the modulation block.

Embodiments may further include: in the DL, injection of 2G/3G signal generated at the time domain into the 4G/5G DU while bypassing the Modulation, Layer Mapping, Precoding, RE mapping and iFFT blocks; and use MUST feature to manipulate the Modulator I/Q output such that the I/Q samples will reflect the desired 2G/3G signal. Adjustments to the Modulator output sample rate can be done.

Embodiments may further include: the preceding paragraph configuration with MUST coefficients configuration per sample to be configured regardless of the LTE standard definition to allow higher quality 2G/3G signal output from the Modulator block; generation of the 2G/3G signal in the time domain and performing iFFT or alternatively generate 2G/3G signal at the frequency domain as in split option 7.2; and use of the preceding three paragraphs in any combination, and/or proper configuration of Layer Mapping and Precoding blocks to inject 2G/3G frequency domain generated signal into the 4G/5G DU with split option 7.2.

Figure 7:
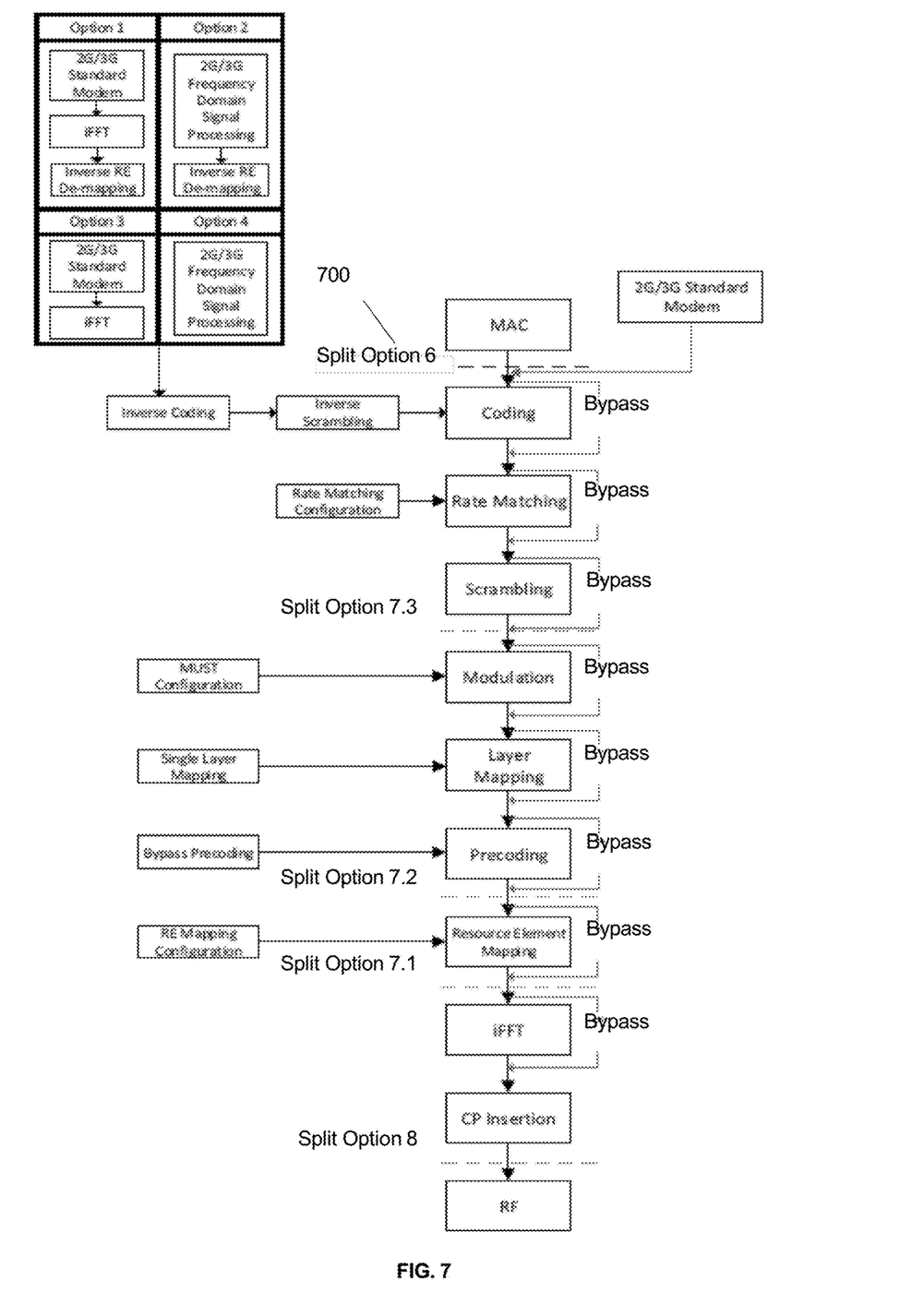
FIG. 7 shows split option 6, in accordance with some embodiments.

Referring to FIG. 7, in split option 6, the split is done between the MAC and the PHY. Namely, all the DL PHY is implemented at the DU. Compared to option 7.3, the DU PHY part includes the encoder, rate matching and the scrambler. Since the rate matching can be configured to do nothing (common configuration) it can act as in a bypass mode. The scrambling is a reordering operation on the signal which is known to the transmitter, hence, the de-scrambling operation can be done at the CU for the 2G/3G signals as a preparation for the DU operation. Regarding the Encoding, the easiest way to inject 2G/3G signal through 4G/5G DU in split option 6 will be to bypass the Encoder. Alternatively, the CU can prepare the data in such manner, so the output of the Encoder will be the expected 2G/3G signal—this method is data dependent but possible. Moreover, in 2G voice transmission, the standard defines modes for sparse transmission (e.g. HR, AMR-HR, DTX) that can be exploit to for our purpose.

Embodiments may further include: in the DL, injection of 2G/3G signal generated at the time domain into the 4G/5G DU while bypassing the Encoder, Rate Matching, Scrambling, Modulation, Layer Mapping, Precoding, RE mapping and iFFT blocks; in the DL, injection of 2G/3G signal generated at the frequency domain, passed through De-Scrambling, into the 4G/5G DU split option 6 while bypassing the Encoder and/or Rate Matching. Rest of the signal handling is per split option 7.3 with the addition of inversing the Scrambling operation at the CU; and injection of 2G/3G signal generated at the frequency domain with the manipulation needed such that at the 4G/5G Encoding+Rate Matching output one will get the desired 2G/3G Signal.

At any option one can either: bypass LTE blocks if this capability exists in the DU or do the inverse operation on the CU such that at the RF (analog) input we'll get the intended standard signal. It's possible since all of the operations are reversible (except in some cases the FEC/decoder); or form new signal generation for 2G and 3G in the frequency domain such that at the iFFT output we'll get standard time domain signal—requires complex mathematical evaluation and redesign of the PHY level of 2G/3G communication system. Interestingly, once done, we might be able to provide improvements to PHY performance by utilizing frequency domain processing.

Embodiments include that in many respects 2G and 3G signals are different, but have similar properties and are treated the same for the purposes of the present disclosure and one of skill in the art would be able to implement the ideas found herein for both 2G and 3G waveforms.

Embodiments include that, as many 4G technologies are being used directly or in slightly modified form for 5G, the present ideas may be variously embodied in 3G/5G systems, 4G/5G systems, 2G/3G/4G/5G systems in any combination, etc., using the equivalent implementation of the present ideas and disclosures in 5G as for 4G. Some of the modes used for 5G are well based on LTE and hence as well it's possible to run 5G over LTE PHY (split options 7.1, 7.2, 7.3, 8 at least). Running 2G/3G/4G over 5G radio is possible and contemplated by the inventors. To clarify, where the present disclosure describes 2G/3G over 4G PHY, the inventors have also contemplated 2G/3G/4G over 5G PHY. As well, the inventors have contemplated communication of time domain generated signals generally (including but not limited to 2G/3G) using a frequency domain generated signal architecture.

In some embodiments a network node may use a different split for 4G than for 5G, so that 2G and 3G may be provided separately from the same network node or cell using a different split, e.g., 2G is provided using a 4G node with an Option 7.1 split while 3G is provided using a 5G node, etc. In the case where 4G and 5G are both available, either at the same device or different devices, the present disclosure contemplates the use of 2G/3G waveforms over either 4G or 5G as appropriate.

In some embodiments, optimizations are contemplated between 2G/3G and 4G/5G, since they are being carried by the same waveform and are potentially generated by the same hardware and/or software.

Regarding 5G over LTE PHY: Since 5G was built over LTE, the intention was to ease the implementation over LTE. Running 2G/3G/4G over 5G radio is possible and hence we must add it to the patent. The communication of time domain generated signal (2G/3G) with frequency domain generated signal architecture (4G/5G).

TABLE 1

| | LTE | New Radio |
|---|---|---|
| Maximum Bandwidth (per cm$^3$) | 20 MHz | 50 MHz (@ 15 kHz), 100 MHz (@ 30 kHz) 200 MHz (@60 kHz), 400 MHz (@120 kHz) |
| Maximum CCs | 5 (currently) | 16 (allowed BW and CCs combinations TBD |
| Subcarrier Spacing | 15 kHz | $2^n$-15 kHz TDM and FDM multiplexing |

TABLE 1-continued

| | LTE | New Radio |
|---|---|---|
| Waveform | CP-OFDM for DL; SC-FDMA for UL | CP-OFDM for DL; CP-OFDM and DFT-s-OFDM for UL |
| Maximum number of subscribers | 1200 | 3300 |
| Subframe Length | 1 ms (moving to 0.5 ms) | 1 ms |
| Latency (Air Interface) | 10 ms (moving to 5 ms) | 1 ms |
| Slot Length | 7 symbols in 500 μs | 14 symbols (duration depends on subcarrier spacing) 2, 4 and 7 symbols for mini-slots |
| Channel Coding | Turbo Code (data) TBCC (control) | Polar Codes (control); LDPC (data) |
| Initial Access | No beamforming | Beamforming |
| MIMO | 8 × 8 | 8 × 8 |
| Reference signals | UE specific DMRS and Cell Specific RS | Front-loaded DMRS (UE-specific) |
| Duplexing | FDD, Static TDD | FDD, Static TDD, Dynamic TDD |

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. The methods may apply to radio access networks, core networks, or other auxiliary networks. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps, modules, functions, or blocks, as described in the figures and specification, may be added or removed from the processes described herein, and may be performed in an alternative order, consistent with the spirit of the invention. Features of one embodiment may be used in another embodiment. Other embodiments are within the following claims.

The invention claimed is:

1. A method for providing signals for time domain radio access communication over a distributed unit (DU) in a virtual Radio Access Network (RAN) architecture supporting frequency domain signal generation, comprising:
dividing a PHY layer between the DU and a Centralized Unit (CU) between an upper PHY and a lower PHY for a first radio access technology in a radio frequency (RF) transmission chain, wherein the first radio access technology is a frequency domain radio access technology, wherein a PHY layer is divided between the DU and the CU, wherein the DU includes the lower PHY, and wherein the CU includes the upper PHY;
generating time domain radio access communication signals for a second radio access technology;
injecting the time domain radio access communication signals into the RF transmission chain; and
receiving and transmitting the time domain radio access communication signals in accordance with the selected split option using the DU.

2. The method of claim 1, further comprising selecting a split option that splits the CU and DU at the analog to digital conversion (ADC)/digital to analog conversion (DAC) level such that ADC/DAC operation is performed at the DU and all other PHY operations are done at the CU.

3. The method of claim 2, further comprising injecting 2G/3G signals into the DAC, and further comprising extracting 2G/3G signals from the ADC with a 4G/5G DU.

4. The method of claim 2, further comprising adding configuration options for the DU to modify an ADC/DAC sample rate and adding filters to comply with 2G/3G requirements.

5. The method of claim 2, wherein the split option selected includes a time domain part, and further comprising transferring frequency domain samples between the CU and the DU.

6. The method of claim 5, further comprising: injecting a 2G/3G signal generated in the time domain into a 4G/5G DU while bypassing an inverse Fast Fourier Transform (iFFT) block; and extracting the 2G/3G signal from the 4G/5G DU while bypassing a Fast Fourier Transform (FFT) block.

7. The method of claim 5, further comprising: generating a 2G/3G signal at the time domain and performing a Fast Fourier Transform (FFT) operation at the CU, and injecting it into a 4G/5G DU as a frequency domain signal; and extracting the 2G/3G signal from the 4G/5G DU after the FFT operation, and processing the signal through the CU.

8. The method of claim 5, further comprising: generating a 2G/3G signal at the frequency domain and injecting it into a 4G/5G DU; and extracting the 2G/3G signal from the 4G/5G DU and processing the signal in the frequency domain.

9. The method of claim 5, further comprising performing resource element mapping and demapping.

10. The method of claim 2, wherein the split option includes the DL stream handled in the DU from a modulation block toward an RF part, and wherein at least one of modulation, layer mapping, precoding, resource element mapping and inverse Fast Fourier Transform (iFFT) are able to be bypassed.

11. The method of claim 10, further comprising using a Multi-User Superposition Transmission (MUST) feature to manipulate a modulator In-phase/Quadrature (I/Q) output such that I/Q output samples reflect a desired 2G/3G signal.

12. The method of claim 2, wherein the split option is done between the Media Access Control (MAC) layer and the Physical (PHY) layer.

13. The method of claim 12, further comprising injecting a 2G/3G signal generated at the time domain into a 4G/5G DU while bypassing Encoder, Rate Matching, Scrambling, Modulation, Layer Mapping, Precoding, RE mapping and iFFT blocks.

14. The method of claim 12, further comprising passing a 2G/3G signal generated in a frequency domain through De-Scrambling into a 4G/5G DU split option 6 while bypassing an Encoder and/or Rate Matching.

15. A non-transitory computer-readable medium containing instructions for providing 2G/3G communication over 4G/5G distributed unit (DU) in a virtual Radio Access Network (RAN) architecture, which, when executed, cause a system to perform steps comprising:
dividing a PHY layer between the DU and a Centralized Unit (CU) between an upper PHY and a lower PHY for a first radio access technology in a radio frequency (RF) transmission chain, wherein the first radio access technology is a frequency domain radio access technology, wherein a PHY layer is divided between the DU and the CU, wherein the DU includes the lower PHY, and wherein the CU includes the upper PHY;
generating time domain radio access communication signals for a second radio access technology;
injecting the time domain radio access communication signals into the RF transmission chain; and
receiving and transmitting the time domain radio access communication signals in accordance with the selected split option using the DU.

16. The non-transitory computer-readable medium of claim 15, the steps further comprising selecting the split option to split the CU and DU at an Analog to Digital Conversion (ADC)/Digital to Analog Conversion (DAC) level such that ADC/DAC operation is performed at the DU and all other PHY operations are done at the CU.

17. The non-transitory computer-readable medium of claim 15, wherein the split option selected includes a time domain part and wherein frequency domain samples are transferred between the CU and the DU.

18. The non-transitory computer-readable medium of claim 15, the steps further comprising including a DL stream handled in the DU from a modulation block toward an RF part, and bypassing at least one of modulation, layer mapping, precoding, resource element mapping and inverse Fast Fourier Transform (iFFT).

19. The non-transitory computer-readable medium of claim 15, wherein a split option is selected to split the Media Access Control (MAC) layer and the Physical (PHY) layer.

20. A system for providing 2G/3G communication over 4G/5G distributed unit (DU) in a virtual Radio Access Network (RAN) architecture, comprising:
at least one processor at a RAN node in communication with a 2G/3G core network and a 4G/5G core network; and
at least one memory in communication with the processor, a PHY layer between the DU and a Centralized Unit (CU) is divided between an upper PHY and a lower PHY for a first radio access technology in a radio frequency (RF) transmission chain, wherein the first radio access technology is a frequency domain radio access technology;
wherein the processor enables selecting at least one split option between an upper PHY and lower PHY;
wherein the processor enables receiving and transmitting 2G/3G signals in the virtual RAN in accordance with the selected split option using the 4G/5G DUs; and
wherein time domain radio access communication signals are generated for a second radio access technology; the time domain radio access communication signals are injected into the RF transmission chain; and the time domain radio access communication signals are received and transmitted in accordance with the selected split option using the DU.

* * * * *